Dec. 25, 1934.   W. J. WACHOWITZ   1,985,702
TANK
Filed July 30, 1932   3 Sheets-Sheet 1

Inventor
Walter J. Wachowitz
Witness
Milton Lenoir
By Brown, Jackson, Boettcher & Dienner,
Attorneys.

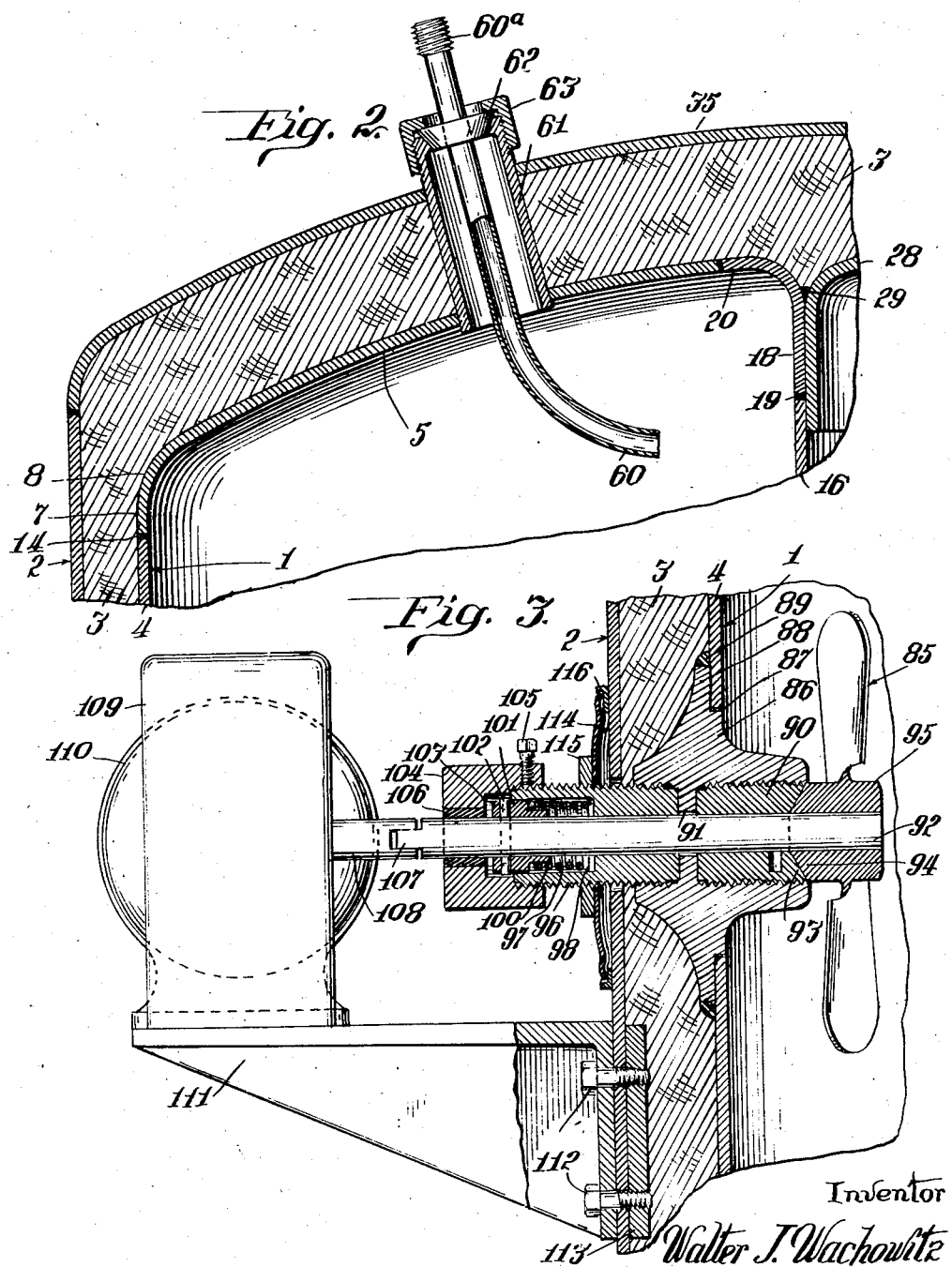

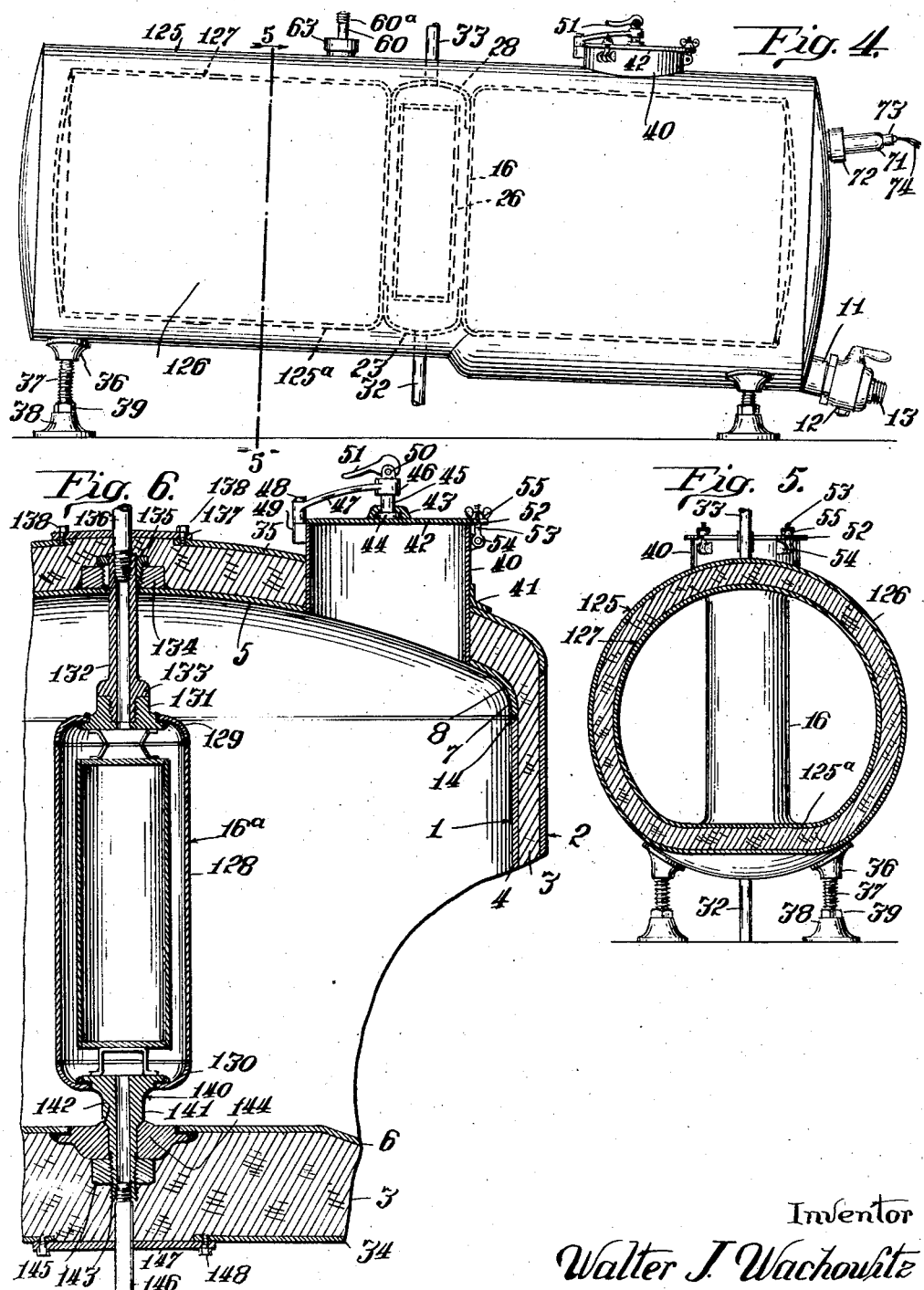

Patented Dec. 25, 1934

1,985,702

UNITED STATES PATENT OFFICE 1,985,702

TANK

Walter J. Wachowitz, Waukesha, Wis., assignor to Alloy Products Corp., Waukesha, Wis., a corporation of Wisconsin Application July 30, 1932, Serial No. 626,398

8 Claims. (Cl. 257—82)

This invention relates to tanks, and has to do with tanks for storing milk, ice cream mixes and other articles of food which should be stored at low temperatures.

In storing milk and ice cream mixes, or other foods containing a large proportion of milk, it is essential that the containers be free of all sharp corners and projections such as would provide lodgement for particles of milk fat or the like, which would collect and provide a breeding place for bacteria. It is also important that the container be capable of being thoroughly washed out and cleaned with facility. In storing milk or the like great care should be taken that the milk does not come into contact with metals which are readily attacked by lactic acid and, for this reason, containers having soldered joints are highly objectionable if used for storing milk. This is due to the fact that the milk will attack most solders and also to the fact that when two different metals are submerged in milk and in contact one with the other, an electrolytic action takes place which tends to destroy the metals and contaminate the milk.

The primary object of my invention is to provide a container for milk or other foods containing milk, which container can be cleaned with facility and is free of all sharp corners and projections. A further object is to provide a container of the character stated formed of a material which is not attacked by milk or acids present in ice cream mixes or the like, which container is free of all soldered joints, the inner surface thereof being formed throughout of the same material. A further and important object of my invention is to provide a container which is highly efficient in maintaining the contents thereof at a sufficiently low temperature to assure that the milk or other liquid within the container will be kept in an unspoiled and palatable condition. Further objects and advantages of my invention will appear from the detail description.

In the drawings:—

Figure 2 is a fragmentary sectional view through the upper portion of the tank, on an enlarged scale, illustrating the filling nozzle and the mounting thereof;

Figure 3 is a sectional view, on an enlarged scale, through the agitator shaft mounting and associated parts, parts being shown in elevation;

Figure 4 is a side view of a horizontal tank in accordance with my invention;

Figure 5 is a section taken substantially on line 5—5 of Figure 4;

Figure 6 is a fragmentary vertical sectional view through a vertical tank illustrating a modified form of my invention.

Figure 1:
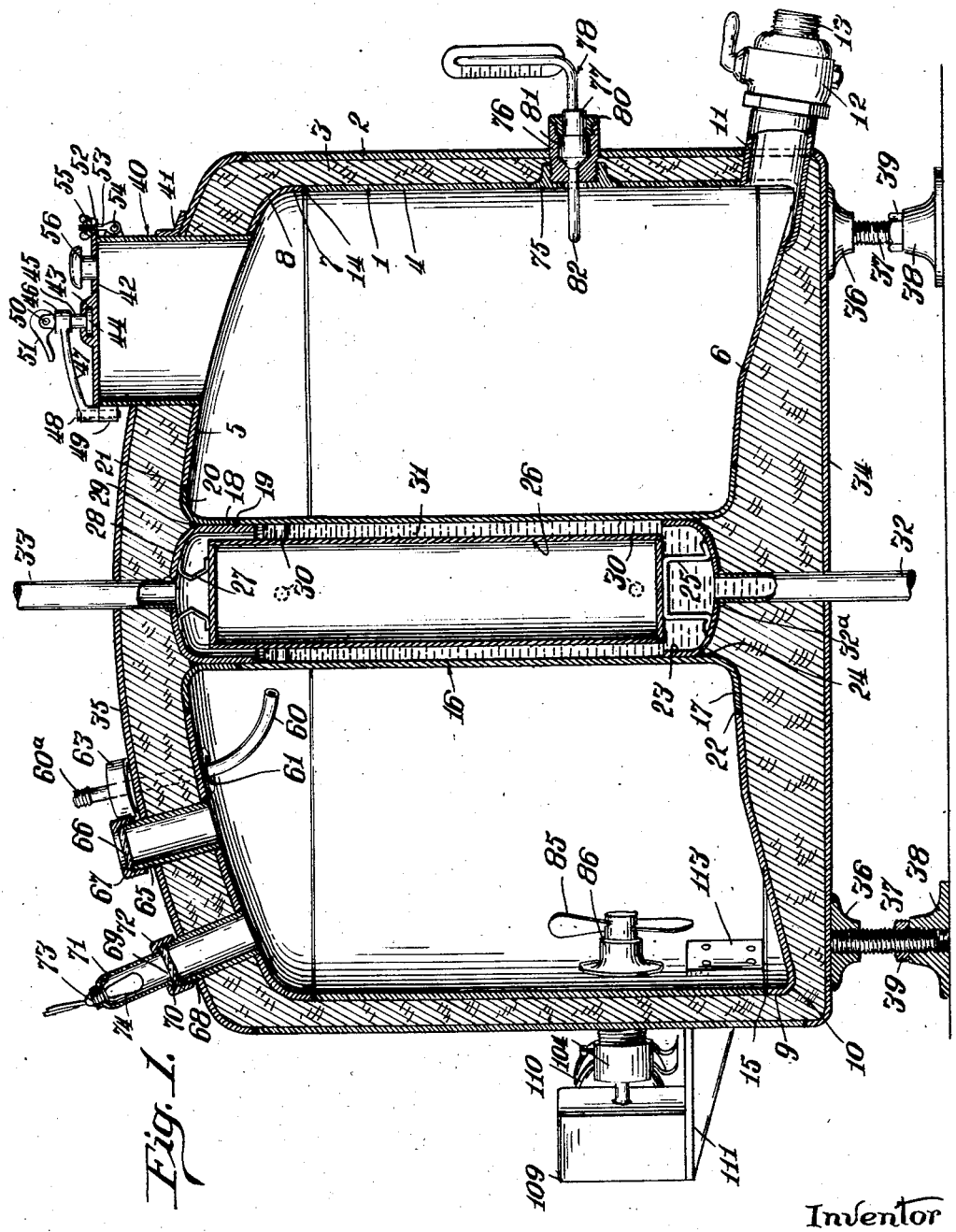
Figure 1 is a central vertical sectional view through a tank in accordance with my invention, parts being shown in elevation.

The tank of my invention comprises an inner cylindrical container 1 and an outer casing 2 disposed in spaced relation to the container, the space between the casing and the container being filled with any suitable thermal insulating material 3, such as ground cork, though any material suitable for this purpose may be employed. The inner container 2 includes a cylindrical body 4 having a head 5 and a bottom 6. The head is provided with a depending peripheral flange 7 connected thereto by an element 8 which is curved on a considerable radius. Bottom 6 is provided with an upwardly extending peripheral flange 9 connected thereto by an element 10 which is curved on a considerable radius, the bottom being shaped in cross-section as shown so as to be inclined toward the element 10. This bottom is also inclined toward an outlet to which is connected an outlet fitting 11 controlled by a valve 12 of known type from which extends a threaded neck 13 adapted for reception of a coupling member of a suitable length of hose or the like for conveying the contents of the tank to any other suitable container. The container 1 is constructed of a metal which is resistant to milk, ice cream mixes and foods of like nature. Preferably, I employ for this purpose an alloy known as "Allegheny metal", which is highly resistant to most acids and is not attacked by milk or like food stuffs such as are frequently stored in tanks. Flanges 7 and 9 of head 5 and bottom 6, respectively, are butt-welded at 14 and 15, respectively, to the ends of body 4. After the welding operation, the welds are ground down and polished off smooth with the inner surfaces of the tank, thus eliminating any unevenness or projections which might provide lodgment for particles of milk fat or food and breeding places for bacteria. Outlet fitting 11 is also of "Allegheny" metal and is welded into bottom 6, the weld being ground down and finished smooth and flush with bottom 6.

A refrigerating cylinder 16 is disposed centrally of container 1 and extends from top to bottom thereof. This cylinder is formed of the same material as the container and is provided, at its lower end, with an outwardly extending flange 17 which curves downwardly and outwardly away from the cylinder on a considerable radius. A collar 18 is butt-welded at 19 to the upper end of the body of cylinder 16, this collar being provided, at its upper end, with an outwardly extending flange 20 which is curved upwardly and outwardly from the cylinder on a considerable radius. Top 5 and bottom 6 of container 1 are provided with circular openings corresponding to the flanges 17 and 20, which fit snugly within these openings and are butt-welded at 21 and 22 to the top and the bottom walls of the container. The welds are ground down and finished smooth and flush with the inner faces of the top and bottom so as to eliminate all projections and recesses. The flanges 17 and 20, each of which is curved on a considerable radius, are capable of flexing to accommodate expansion and contraction of cylinder 16 and thus serve to relieve the top and bottom walls of the container of excessive stresses due to expansion and contraction of the refrigerating cylinder and such as would be apt to cause injury thereto.

A head 23 is secured in the lower end of cylinder 16 by welding 24. A spacer 25 rests upon the upper face of head 23 and supports an inner cylinder 26 which is closed at both ends, the body of this inner cylinder being imperforate. The inner cylinder 26 is held against upward movement by resilient spacing members 27 confined between the upper end of this cylinder and a head 28 which is secured by welding 29 in collar 18.

Cylinder 26 is provided with suitably disposed spacing elements 30 which contact the inner surface of cylinder 16 so as to provide an annular space 31 between the two cylinders. This space is for reception of a liquid refrigerant. Any suitable refrigerant may be utilized and any suitable circulating system for supplying refrigerant to and withdrawing it from the cylinder 16 may be provided. If a volatile refrigerant, such as ammonia, is used, this refrigerant may be supplied to the lower end of cylinder 16 through a pipe 32 welded at 32a in head 23 centrally thereof. The level of the liquid refrigerant within the space 31 may be approximately that shown in Figure 1 so as to leave an expansion space in the upper portion of cylinder 16 for the gases evolved. A take-off pipe 33 is welded to head 28 centrally thereof and provides means for taking off the gases from the upper portion of cylinder 16. Pipes 32 and 33 pass through the bottom 34 and head 35, respectively, of the casing 2 and are welded thereto so as to prevent entry of moisture about the pipes and into the insulation 3. Any other suitable or preferred means for effecting the desired moisture tight closure about the pipes 32 and 33 may be employed.

Casing 2 is preferably constructed in the same manner as container 1, bottom 34 and head 35 being provided with peripheral flanges which are butt-welded to the body of the casing. Though casing 2 is preferably constructed of "Allegheny metal", this is not essential, since the contents of container 1 do not come in contact with casing 2, and the casing may be formed of any other suitable or preferred material. Suitably disposed fittings 36 are welded to the under face of bottom 34 and have threaded engagement with pipe legs 37 which screw into foot plates 38 shaped to seat flat upon the floor or other supporting surface. Jam nuts 39 screw upon the legs 37 and serve to secure them in adjustment.

A manhole fitting 40 extends through the top of container 1 and the top of casing 2, this fitting being welded to the top of the container and the weld being ground down and finished off smooth so as to avoid all projections or recesses.

An angle collar 41 extends about fitting 40 and is welded thereto and to head 35 of casing 2 so as to brace the fitting and provide a fluid tight closure about the same. The upper end of fitting 40 is finished smooth and flat to provide a seat for a circular manhole cover 42, provided at its upper side with a slotted and flanged boss 43 which receives head 44 at the lower end of a pin 45, slidable through an eye 46 at one end of a supporting arm 47. This arm is pivoted at 48 on a bracket 49, suitably secured to fitting 40. Pin 45 is pivotally secured at its upper end, at 50, in a slotted cam lever 51 which bears upon eye 46. The cover 42 is provided with a plurality of suitably disposed and slotted lugs 52 projecting outwardly therefrom and adapted to receive swing bolts 53 pivoted at 54 on the manhole fitting. Wing nuts 55 screw upon the bolts and cooperate therewith and with lugs 52 for tightly clamping the cover 42 into position. When it is desired to uncover the fitting 40, the nuts 52 are first loosened and the swing bolts are swung downwardly into inoperative position, after which lever 51 is turned into position to raise the cover 42 from its seat. Arm 47 is then swung into position so as to move the cover from over the manhole fitting, thus giving access through the latter to container 1 for washing and cleaning thereof, or for any other purpose. Cover 42 may be provided with a hooded vent 56, of known type, to permit of flow of air into and from the container 1 during emptying and filling thereof.

I preferably provide a filling nozzle 60 which extends through a tubular fitting 61 (Figure 2), welded at its lower end to head 5 of the container, the weld being ground down and finished off smooth, the tubular fitting 61 being of the same metal as head 5. Fitting 61 extends through head 35 of casing 2, to which it may be secured by welding or in any other suitable manner to effect a fluid tight closure about the fitting. The upper end of fitting 61 is beveled downwardly and inwardly to provide a seat for a similarly beveled shoulder 62 rigid with tube 60. A flanged nut 63 screws onto the upper portion of the fitting and bears upon the upper face of shoulder 62 for clamping the shoulder tightly in its seat. The upper portion 60a of nozzle 60 is enlarged and threaded for reception of a cooperating coupling member, by means of which the nozzle is connected to a suitable conduit for supplying to the nozzle the liquid to be stored. Nozzle 60 is curved as shown and is so disposed as to direct the stream of liquid against cylinder 16, down which the liquid flows, thus preventing foaming of the liquid such as would occur if a stream of milk or like liquid were discharged into a body of liquid within the container 1. This also has the advantage that the entering liquid flows downwardly over the cylinder 16 in a thin layer or film so as to be cooled as it enters the container.

A tubular fitting 65, similar to fitting 61, extends through the top or head of container 1 and the head of casing 2. A glass disc 66 seats upon the upper end of fitting 65 and is held in position by a flange nut 67 screwing upon the fitting. The disc 66 provides, in conjunction with the fitting 65, an observation opening. Adjacent this fitting 65 a similar fitting 68 is secured through the head of container 1 and the head of casing 2. A glass disc 69 seats upon the upper end of fitting 68 and a flange 70, at the lower end of a metal hood and reflector 71, seats upon the upper face of the glass disc 69. A flanged nut 72 screws upon the fitting 68 and secures disc 69 and hood 71 thereto. A socket member 73 is suitably mounted in the outer end of hood 71 and receives an electric light bulb 74 of known type. This provides means for illuminating the interior of container 1 for observation purposes.

A fitting 75, formed of the same metal as the container 1, is butt-welded into the wall of the container, the weld being ground down and finished off smooth and flush with the inner surface of the wall. A sleeve 76 screws into fitting 75 and receives barrel 77 of a thermometer 78 of known type. Barrel 77 is tapered at its inner end and seats accurately in a similarly tapered seat provided at the inner end of the bore of sleeve 76. A nut 80 screws into the outer end of the sleeve and bears against a shoulder 81 formed on barrel 77 for holding the barrel tight to its seat. A tube 82 extends from barrel 77 through aligned openings in sleeve 76 and fitting 75 so as to project into the liquid within container 1. The inner end of sleeve 76 is accurately finished and seats tightly against the outer surface of fitting 75, which is also accurately finished, so as to provide a liquid tight closure therewith. Any desired number of thermometers may be employed, and these thermometers may be of any suitable or preferred type.

In order to eliminate possibility of the liquid contents of container 1 freezing on the refrigerator cylinder 16, I provide means for gently agitating the contents of the container so as to assure circulation thereof. This agitating means also serves to bring all parts of the body of liquid within the container into contact with the cylinder 16, assuring that the liquid is cooled throughout and uniformly. Preferably, I provide an agitator in the form of a propeller 85 disposed within the container 1 at one side thereof, this agitator being rotated at low speed in a suitable manner. I have shown the agitator as disposed with its axis of rotation substantially radial of the container 1, which arrangement gives very satisfactory results, though the agitator may be disposed in various other ways if desired.

Sanitary requirements preclude the use of stuffing boxes of ordinary type in containers for milk, ice cream mixes and other articles of food. I have provided, therefore, a special mounting for the agitator shaft, which eliminates stuffing boxes of ordinary type, while preventing leakage and permitting of rotation of the agitator shaft. This mounting is illustrated more clearly in Figure 3. A flanged fitting 86 of the same metal as container 1 is fitted through an opening in the wall of the container. The body of this fitting is butt-welded at 87 to the container wall, the weld being ground down and finished smooth. Flange 88 of fitting 86 is edge-welded at 89 to the outer face of the wall of container 1. A bushing 90, preferably an oilless bronze bushing of known type, is screwed into fitting 86 from the inner end thereof, the outer end of this bushing contacting the inner face of a shoulder 91 of the fitting. The threads of bushing 90 are quite fine and the pitch thereof is such that the rotation of propeller shaft 92, which is mounted through the bushing, tends to screw the bushing into the fitting so as to hold the outer end of the bushing tightly against shoulder 91. The inner end of bushing 90 is beveled so as to provide a conical seat 93 in which seats conical element 94 of hub 95 of agitator 85. The agitator, including the hub thereof, and the shaft 92 are formed of "Allegheny metal" or stainless steel and the hub 95 serves to close the inner end of fitting 86 so as to prevent ready access of the contents of the container to the bushing 90. A sleeve 96 screws into the outer end of fitting 86 and contacts shoulder 91, this sleeve preferably tapering slightly toward the shoulder 91 so as to be tightly secured in the fitting in contact with the outer face of the shoulder.

The inner portion of sleeve 96 provides a bearing for shaft 92 and this sleeve is provided with an enlarged bore extending from the outer end thereof. A thrust collar 98 seats against the sleeve and about the shaft at the inner end of the bore, and a coiled spring 100, of non-corroding metal, mounted in bore 97 and about shaft 92, is confined between collar 98 and a flanged collar 101 fitting about the shaft and entering the outer end of the spring. Outward movement of collar 101 is positively limited by a thrust collar 102 mounted about the shaft and held against outward movement therealong by a taper pin 103 secured through the shaft. A flanged nut screws upon the outer end of sleeve 96 and is secured in adjustment thereon by a set screw 105. Nut 104 carries a bearing collar 106 which constitutes an oilless bronze bearing for shaft 92. The outer end of shaft 92 is connected by a suitable coupling 107 to shaft 108 of a speed reducing unit 109 which is driven in a known manner from an electric motor 110. The unit 109 is of known type and need not be illustrated nor described in detail. The coupling 107 is of conventional type and it will be understood that any suitable coupling may be employed which will permit of endwise movement of shaft 92 under the influence of spring 100. The motor 110 and speed reducing unit 109 are conveniently supported by a suitable bracket 111 secured by cap screws 112 to a relatively thick plate 113 welded or otherwise suitably secured to the inner face of casing 2.

A resilient metal collar 114 is urged toward casing 2 by a nut 115 which screws upon sleeve 96 and contacts the inner portion of the collar. A gasket 116, of rubber or other suitable material, is confined between the casing and the outer edge portion of collar 114, which collar is shaped to conform to the curvature of casing 2. This provides a moisture tight closure about sleeve 96 and eliminates possibility of moisture entering between the casing 2 and container 1 about sleeve 96, which moisture would dampen the insulating material 3 and greatly reduce the efficiency thereof.

The container 1 is filled, either completely or partially, with milk, ice cream mix, or other food stuff which it is desired to store, by means of the nozzle 60 in the manner previously described. The milk or the like comes into direct contact with the cylinder 16, which is maintained at the proper low temperature by the refrigerant circulated therethrough, and the agitator 85 is driven at low speed so as to agitate gently the milk and assure that all parts of the body of milk or like food stuff in the container are brought into contact with the cylinder 16 so as to be cooled thereby. This agitation and circulation of the milk also serves to prevent freezing thereof onto the cylinder 16, thus avoiding alteration in the water content of the milk or other food in the container 1 from this cause. When the agitator 85 is not in operation, the spring 100 serves to hold hub 94 snugly seated in the inner end of bushing 90 so as to form a liquid tight closure therewith, which suffices to prevent leakage about the shaft 92. When the agitator is in operation, the blade thereof, acting upon the liquid within the container, exerts an outward push upon the shaft 92 and hub 95 which supplements the action of the spring in maintaining the hub seated in the bushing. I thus provide a highly efficient mounting for the agitator shaft which is free of stuffing boxes or the like objectionable structures, and which assures against leakage about the agitator shaft while permitting of the desired rotation thereof.

In Figures 4 and 5 I have illustrated my invention as applied to what is termed a horizontal tank. A refrigerating cylinder 16 is disposed centrally of this tank, which is inclined toward the outlet or drain fitting 11. The under portion of the tank extending from the higher end thereof to the cylinder 16 is flattened at 125a, the tank being designated 125, for enabling the contents of the tank to drain therefrom about the cylinder 16. The remainder of tank 125 is of circular cross-section, and this tank comprises an outer casing 126 and an inner container 127. Refrigerant is supplied to, and withdrawn from, the cylinder 16 in the same manner as in Figure 1. The top and the bottom of cylinder 16 are secured to the top and the bottom of container 127 by curved flanges, as before, and the tank is provided with suitable fittings. The agitator is suitably disposed within container 127 for agitating the contents of the container, as previously described.

In Figure 6 I have provided a removable refrigerating cylinder 16a comprising a cylindrical body 128 to which are welded top and bottom heads 129 and 130, respectively, the welds being ground down and finished smooth. A flanged fitting 131 is welded into head 129 and receives the end of a tube 132, which screws into the fitting and is provided with an outer shoulder 133 which seats tightly upon the upper end of the neck of the fitting. Tube 132 extends through head 5 and through a collar 134 welded onto the upper surface of this head. A tapered split nut 135 screws into collar 134 and clamps tube 132 in position. A take-off pipe 136 screws into the upper end of tube 132, this pipe passing through a plate 137 removably secured by cap screws 138 to the top of casing 2. Removal of plate 137 gives access to nut 135 and the parts associated therewith.

A flanged fitting 140 is welded in lower head 130 and is provided with a neck 141 reduced in diameter to provide a downwardly tapering shoulder 142 and a tube extending downwardly therefrom. Shoulder 142 seats in a corresponding recess of a flanged fitting 144 welded into bottom 6 of container 1. A nut 145 screws onto neck 143 and contacts the under face of fitting 144 for holding shoulder 142 of fitting 141 tightly seated in the fitting 144 so as to form therewith a liquid tight and pressure resistant closure. A refrigerant supply pipe 146 screws into the lower end of neck 143, this pipe passing through a plate 147 removably secured by cap screws 148 to bottom wall 34 of casing 2. The refrigerating cylinder 16a, mounted in this manner, may be removed from, and replaced in, the container 1 with expedition and facility as desired, or as conditions may require. In order to remove cylinder 16a, pipes 136 and 146 are disconnected from the tube 132 and neck 143, respectively. Split nut 135 is loosened sufficiently to permit of tube 132 being unscrewed from fitting 131, after which this tube is moved into its uppermost position, in which position it may be held by the nut 135. Nut 145 is then removed from neck 143. After this has been done, the cylinder 16a may be raised sufficiently to withdraw neck 143 from fitting 144, and the cylinder may then be removed from the container through the manhole fitting 40. In replacing the cylinder the above operation is reversed.

As above indicated, and as will be understood by those skilled in the art, changes in construction and arrangement of parts of my invention may be resorted to without departing from the field and scope of the same, and I intend to include all such variations, as fall within the scope of the appended claims, in this application in which the preferred forms only of my invention are disclosed.

What I claim is:—

1. In combination, in a tank structure of the character described, a container comprising a top wall and a bottom wall, and a cylinder for reception of a refrigerant and disposed within the container for contact with a liquid contained by the latter, said cylinder being provided at each end with an outwardly extending flange connected to the cylinder by an element curved on an appreciable radius, said flanges being secured at their outer edges to the top and the bottom walls of the container.

2. In combination, in a tank structure of the character described, a container comprising a top wall and a bottom wall, and a cylinder for reception of a refrigerant and disposed within the container for contact with a liquid contained therein, said cylinder being provided at each end with an outwardly extending flange connected to the cylinder by an element curved on an appreciable radius, the top and bottom walls of the container having openings corresponding to said flanges and the flanges being butt-welded to the edges of said walls at said openings, the welds being ground down smooth and flush with the inner surfaces of the container walls.

3. In combination, in a tank structure of the character described, a container comprising a body and a top head and a bottom head each having a peripheral flange extending toward the body and connected to its associated head by an element curved on an appreciable radius, the flanges being butt-welded to the ends of the body and the welds being finished smooth and flush with the inner surfaces of the body and the flanges, and a cylinder for reception of a refrigerant and disposed within the container, said cylinder being provided at each end with an outwardly extending flange connected to the cylinder by an element curved on an appreciable radius, said flanges being fitted in the heads and butt-welded thereto with the welds finished smooth and flush with the inner surfaces of the heads.

4. In combination, in a tank structure of the character described, a container, a fitting welded into the wall of the container, a bushing secured in said fitting in the inner end thereof, and provided in its inner end with a socket, a shaft rotatably mounted in the bushing, a driven member secured to the inner end of the shaft and having an element seating in said socket, and yielding means means for driving the shaft, and yielding means for urging the shaft outwardly through the bushing and maintaining said element tightly seated in the socket of said bushing.

5. In combination, a container, a fitting secured through the wall of the container, a bushing secured in the fitting from the inner end thereof, the inner end of said bushing being shaped to provide a socket within the length of the fitting, a shaft rotatably mounted through the bushing, a driven member secured on the inner end of the shaft and comprising an element shaped to seat accurately in the socket of the bushing and of a size to close the inner end of the fitting, means for rotating said shaft, and yielding means for urging the shaft outwardly through the bushing and maintaining said element in close contact with the bushing socket.

6. In combination, a container, a fitting secured through a wall of the container, a bushing secured in the fitting from the inner end thereof, said bushing having its inner end shaped to provide a socket, a sleeve secured in the fitting from the outer end thereof, a shaft rotatably mounted through said sleeve and the bushing, means for rotating said shaft, an agitator member comprising a hub secured on the inner end of the shaft, the outer end of the hub being shaped to seat accurately in the socket at the inner end of the bushing, and means for yieldingly urging the shaft outwardly through the bushing and the sleeve and for maintaining the hub snugly seated in said socket.

7. In combination in a tank structure of the character described, a container comprising a cylindrical body and end heads, each of said heads having a peripheral flange extending toward the body and connected to its associated head by an element curved on an appreciable radius, the flanges being butt welded to the ends of the body, and a cylinder for reception of a refrigerant and disposed within the container, said cylinder being provided at each end with an outwardly extending flange connected to the cylinder by an element curved on an appreciable radius, said flanges of said cylinder being fitted into the walls of the container and butt welded thereto.

8. In combination in a tank structure of the character described, a container, a refrigerating unit of relatively small diameter disposed within the container, tubular members extending from the ends of said unit and opening thereinto for supplying refrigerant thereto and withdrawing refrigerant therefrom, said members extending through opposite walls of the container, and means cooperating with said walls and said tubular members for supporting said unit within said container.

WALTER J. WACHOWITZ.